Dec. 22, 1964  H. M. BRODY  3,162,021
REFRIGERATION SYSTEM INCLUDING CHARGE CHECKING MEANS
Filed March 9, 1964
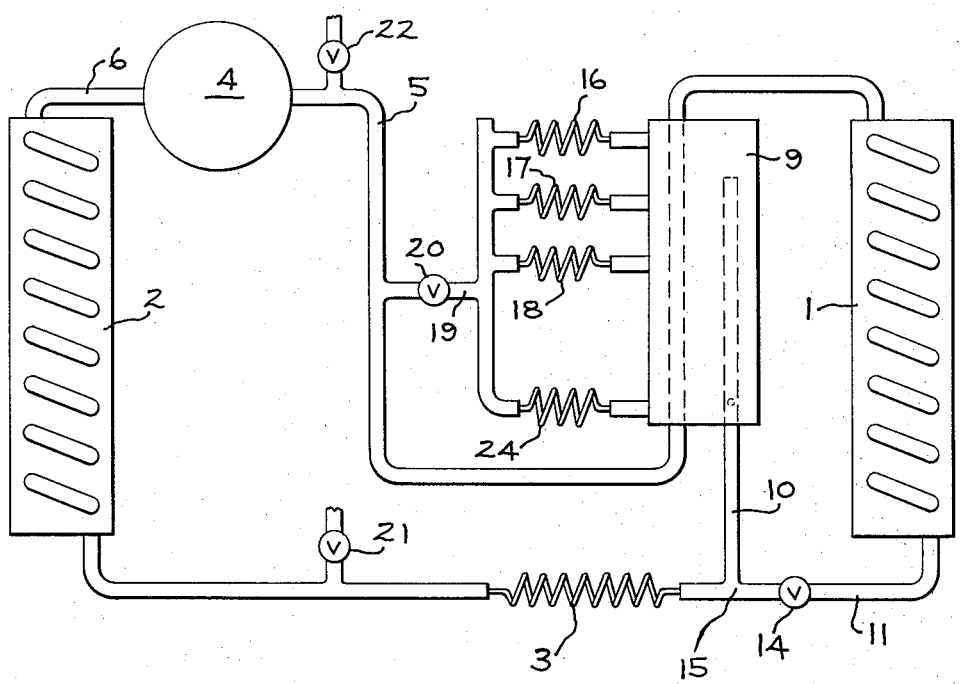
INVENTOR.
HERBERT M. BRODY
BY *Walter E. Buhle*
HIS ATTORNEY

United States Patent Office 3,162,021
Patented Dec. 22, 1964

3,162,021
REFRIGERATION SYSTEM INCLUDING CHARGE CHECKING MEANS
Herbert M. Brody, Tyler, Tex., assignor to General Electric Company, a corporation of New York
Filed Mar. 9, 1964, Ser. No. 350,366
4 Claims. (Cl. 62—292)

The present invention relates to refrigeration systems of the type employed for conditioning the air within an enclosure and is particularly concerned with a closed system comprising fixed flow control means for controlling the flow of refrigerant through the system, dead-end charge modulating means for regulating the effective circulating charge of the refrigerant under various operating conditions and charge checking means for quickly determining the total charge of refrigerant in the system.

A refrigeration system of the type used for conditioning the air within an enclosure comprises a refrigerant circuit including, in closed series flow connection, a first heat exchanger, flow restricting means, a second heat exchanger and a compressor. The compressor withdraws low pressure refrigerant vapor from one of the heat exchangers and discharges high pressure refrigerant to the other. A flow restrictor, generally known as capillary tube, provides a simple and low cost means for controlling or restricting the refrigerant flow so as to maintain a pressure difference between the two heat exchangers. However, since a capillary tube provides a substantially fixed flow restriction, it has only one ideal operating condition regardless of whether the refrigeration system is of the simple or cooling type or is of the reversible or heat pump type. For example, a simple refrigerant circuit including a capillary tube flow restrictor will operate with maximum efficiency within a relatively narrow range of temperatures and pressures determined by the system design and charge. For most efficient operation, a reversible or heat pump type system normally requires a smaller circulating charge of refrigerant on the heating cycle than on the cooling cycle. A well-known means for modifying or changing the circulating refrigerant charge depending upon the operating conditions comprises a dead-end storage receptacle which is subjected to an ambient or system temperature or pressure condition and which is connected by a two-way flow connection to a portion of the refrigerant circuit so that refrigerant is withdrawn from or added to the circuit by the modulating means in accordance with changes in the pressure or temperature conditions to which the modulating means is subjected.

While such a modulating means provides some control over the effective charge of refrigerant circulating through the system and hence provides for most efficient operation under varying conditions, there is nevertheless an optimum charge for each system the amount of which depends on a number of factors including for example the lengths of the conduits connecting the heat exchangers and the compressor.

Recently there has been provided or proposed refrigeration systems including as an integral part thereof charge checking means for quickly determining whether or not a system contains the proper refrigerant charge. Refrigeration systems including such charge checking means are disclosed and claimed, for example, in the applications of Herbert M. Brody, Serial No. 284,155, filed May 29, 1963, and Serial No. 307,835, filed September 10, 1963, both of which applications are assigned to the same assignee as the present invention. These systems have in common the provision in the system of a container capable of containing in liquid form the optimum charge of refrigerant for the system, means for operating the system so that substantially all of the charge will collect in that container and means in the form of a sight glass or bleed cock whereby the serviceman can determine whether or not the collected liquid refrigerant represents the optimum charge for the system.

In the application of Warren A. Spofford, Serial No. 350,367 (Docket 9D-5994) filed concurrently herewith and assigned to the same assignee as the present invention there is broadly disclosed and claimed systems including charge checking means in which a highly restrictive refrigerant conduit or vent connecting the container to a low pressure portion of the system is used in place of a sight glass or bleed cock for detecting the level of liquid refrigerant in the container.

As the invention of the Spofford application was made prior to the present invention, I therefore do not herein claim as my invention anything shown or described in that application which is to be regarded as prior art with respect to the present invention. Rather the present invention is specifically directed to a refrigeration system including a charge modulating means comprising a dead-end storage receptacle which is connected by a two-way flow connection to a low pressure portion of the system, means for operating the system on a charge checking cycle whereby eventually all of the charge can be transferred to the receptacle and means including one or more restrictive vents connecting the receptacle to a low pressure portion of the system whereby the quantity of liquid contained in the receptacle can be accurately determined.

Further features and advantages of the invention will become apparent as the following description proceeds and the features of novelty which characterize the invention will be pointed out with particularity in the claims annexed to and forming a part of this specification.

For a better understanding of the invention reference may be had to the accompanying drawing in which the single figure is a diagrammatic illustration of the simple refrigeration system embodying the invention.

While the present invention will be specifically described with reference to a simple air conditioning system for cooling an enclosure, it will be obvious that it is also applicable to a reversible system in which the flow of refrigerant through the circuit is reversed for the purpose of either cooling or heating an enclosure and in which a charge modulating means may be employed to provide a difference in the effective circulating charge. Such a system is shown for example in Patent 3,006,155—Vanderlee et al., issued on October 31, 1961, and assigned to the same assignee as the present invention.

With reference now to the drawing, the illustrated embodiment of the invention comprises a simple refrigeration system including a first heat exchanger or evaporator 1, a second heat exchanger or condenser 2, and fixed flow restricting means in the form of a capillary tube 3 connecting these two heat exchangers. A compressor 4 withdraws low pressure or vaporized refrigerant from the evaporator 1 through a suction line 5 and discharges hot compressed or high pressure refrigerant to the condenser 2 through the discharge line 6. Thus the compressor, condenser 2, capillary tube 3, evaporator 1 and suction line 5 are connected to form a closed refrigerant circuit in which the capillary tube 3 provides fixed means for normally controlling the flow of refrigerant from the condenser 2 to the evaporator 1 to provide the desired pressure differential between these two heat exchangers.

As has been previously indicated, in any refrigerant circuit including a fixed or capillary tube flow restricting means, there is an optimum circulating charge for most efficient operation of the system under any particular set of operating conditions. For the purpose of modifying or changing the effective circulating refrigerant charge so as to provide the most efficient operation of the system over a range of operating conditions, the system also includes a charge modulating means in the form of a dead-end storage receptacle 9 which, in the illustrated embodiment is in heat exchange relationship with a portion of the suction line 5. The receptacle is directly connected by a two-way flow connection or conduit 10 to a portion of the low pressure side of the circuit, preferably to the conduit 11 connecting the capillary tube 3 to the inlet end of the evaporator 1.

When the compressor 4 is operating, the temperature of the receptacle 9 follows the temperature of the low pressure refrigerant returning to the compressor through the suction line 5 so that the refrigerant is withdrawn from or returned to the system through the connection 10 depending upon the temperature of the refrigerant flowing through the line 5 and the system pressure and temperature conditions in the low pressure portion of the system, such as the conduit 11, to which the two-way flow connection 10 is directly connected. By this arrangement, the receptacle 10 holds a superheat which in the illustrated embodiment of the invention is equivalent to the pressure drop through the evaporator 1. It maintains its superheat either by adding or removing charge from the main refrigerant circuit through the two-way flow connection 10 depending, as previously stated, on the system conditions including the temperature of the refrigerant flowing through the suction line 5 and the pressure conditions in that portion of the system represented by the conduit 11.

In order that the receptacle 9 can provide the desired normal modulation of the refrigerant flow during operation of the system, it is also essential that the system contain the proper total charge of refrigerant and it sometimes becomes necessary to check or determine the total charge of refrigerant in the field. For example, in the case the system must be opened for any reason or a leak develops, it is necessary to replace any refrigerant lost. Also, in the field installation of a split system in which the condenser is placed outside an enclosure and the evaporator within the enclosure, the lengths of the refrigerant lines connecting the compressor with the two heat exchangers will vary depending upon the distance between the installed positions of the two heat exchangers.

In accordance with the present invention, means are provided for operating the system on a charge checking cycle whereby all or substantially all of the charge contained within the system is transferred to the receptacle 9 which is made of a capacity sufficient to contain at least the total optimum charge of refrigerant in liquid form. More specifically, there is provided a normally open valve 14 downstream from the point 15 at which the two-way flow connection 10 is connected to the conduit 11 and one or more vents or restrictors such as restrictors 16, 17 and 18 connected to the receptacle 9 and in turn connected through a conduit 19 including a normally closed valve 20 to the suction line 5. When a plurality of restrictors are used, they are connected to the receptacle at different levels.

For operation of the system on the charge checking cycle, the normally opened valve 14 is closed and the normally closed valve 20 is opened. Closing of the valve 14 stops flow of refrigerant to the evaporator 1 so that upon operation of the compressor on the charge checking cycle, refrigerant flowing from the condenser 2 flows through the connection 10 into the receptacle 9 while gaseous refrigerant is withdrawn from the upper portions of the receptacle 9 through the various restrictors 16, 17 and 18, the conduit 19 and the open valve 20.

The restrictors 16, 17 and 18 may be either highly restrictive capillary tubes or may be in the form of highly restrictive porous plugs composed, for example, of sintered porous bronze as described for example in Patent 2,576,610—Kunzog. Regardless of the form of the restrictors 16, 17 and 18, they are designed to have a flow which is small as compared with the normal flow through the normal restrictor 3 in order to provide a higher than normal pressure condition within the receptacle 9 such that substantially all of the charge in the system will collect as a liquid in this high pressure volume.

So long as the restrictors 16, 17 and 18 are passing refrigerant vapor rather than liquid, there is no evaporation of the refrigerant as it passes through the restrictors so that the restrictors and the adjacent downstream areas therefrom will not be chilled. On the other hand, when liquid refrigerant flows through any one or more of the restrictors, the liquid expands and vaporizes as it passes therethrough with the result that the surfaces in the immediate vicinity of the restrictor will be chilled so that frost will collect on the outer surfaces thereof. Thus the presence or absence of frost are respectively indications of liquid or vapor flow. In other words, when the liquid level within the receptacle 9 reaches the lowest restrictor 18, a temperature drop across the restrictor will occur causing ice to form on the downstream side of the restrictor.

By providing a number of restrictors at different levels, means are provided for establishing a system charge of different amounts as required for the specific installation. For example, self-contained units require the least charge while split units in which the lengths of the conduits between the indoor and outdoor heat exchangers are of substantial length require a large charge. Taking into consideration the standard capacities for such connections, the receptacle 9 may be suitably calibrated as to the positions of the various restrictors 16, 17 and 18 so that the serviceman knowing the proper liquid level in the receptacle 9 for any given installation is able to determine whether the charge is proper by the frosting or lack of frosting of the various restrictors. By means of a bleed off valve 21 or a charging valve 22, refrigerant is either removed or added to the system until the proper charge is present.

With some systems, a minimum flow of refrigerant during the charge checking cycle may be required to insure adequate compressor cooling. In this case, a restrictor 24 may be added in parallel with the charge measuring restrictors 16, 17 and 18, this restrictor 24 being connected adjacent the bottom of the receptacle 9 where it is subjected always to the flow of liquid refrigerant under the control of the valve 20. The restrictor 24 permits a metered amount of liquid to return to the compressor during the entire charge checking cycle. However, its flow should be sufficiently small so that it does not substantially interfere with the charge measuring operation or if desired its flow may be taken into consideration in determining the liquid level of refrigerant in the receptacle 9 for any given system.

While there has been shown and described a specific embodiment of the present invention, it will be understood that the invention is not limited thereto and it is intended by the appended claims to cover all modifications within the spirit and scope of the invention.

What I claim as new and desire to secure by Letters Patent of the United States is:

1. A refrigeration system comprising a first heat exchanger, a conduit including a fixed flow restricting means, a second heat exchanger, a suction line and a compressor series connected to form a closed normal refrigerant circuit in which the compressor withdraws low pressure refrigerant from the second heat exchanger and discharges high pressure refrigerant to the first heat exchanger, charge modulating means comprising a dead-end storage receptacle capable of containing the entire refrigerant charge for said system and connected by a two-way flow connection to a point in said conduit, a normally open valve between said point and said second heat exchanger and adapted when closed to stop the flow of refrigerant to said second heat exchanger, at least one charge checking line including a flow restrictor and normally closed valve means connecting said receptacle to a portion of said circuit containing low pressure refrigerant when said first valve is closed, said flow restrictor having a flow restriction such that when said system is operated with said normally open valve closed and said normally closed valve means open substantially all of the refrigerant in said system will collect as a liquid in said receptacle, said charge checking line being connected to said receptacle at an elevation such that said flow restrictor will frost due to the passage of liquid refrigerant therethrough when the amount of liquid collected in said receptacle is substantially equal to the proper charge of refrigerant for said system.

2. A refrigeration system comprising a first heat exchanger, a conduit including a fixed flow restricting means, a second heat exchanger, a suction line and a compressor series connected to form a closed refrigerant circuit in which the compressor normally withdraws low pressure refrigerant from the second heat exchanger and discharges high pressure refrigerant to the first heat exchanger, charge modulating means comprising a dead-end storage receptacle capable of containing the entire refrigerant charge for said system and connected by a two-way flow connection to a point in said conduit, a normally open valve between said point and said second heat exchanger, and adapted when closed to stop the flow of refrigerant to said second heat exchanger, at least two charge checking lines each including a flow restrictor connecting said receptacle to a portion of said circuit containing low pressure refrigerant when said first valve is closed, normally closed valve means for controlling flow through said lines, said flow restrictors having a flow restriction such that when said system is operated with said normally open valve closed and normally closed valve means open substantially all of the refrigerant in said system will collect as a liquid in said receptacle, said charge checking lines being connected to said receptacle at elevations such that frosting of at least one flow restrictor due to the passage of liquid refrigerant therethrough is an indication that the amount of liquid collected in said receptacle is substantially equal to the proper charge of refrigerant for said system.

3. A refrigeration system comprising a condenser, fixed flow restricting means, an evaporator, a suction line and a compressor series connected to form a closed refrigerant circuit, charge modulating means comprising a dead-end storage receptacle in heat exchange relation with said suction line and connected by a two-way flow connection to a point in said system between said restricting means and said evaporator, a normally open valve between said point and said evaporator, at least two flow restrictors connecting said receptacle to said suction line and normally closed valve means for preventing flow through said flow restrictors, said flow restrictors having flow restrictions such that during operation of said system with said normally open valve closed and said normally closed valve open substantially all of the refrigerant in said system will collect as a liquid in said receptacle, one of said flow restrictors being connected to said receptacle below the other of said flow restrictors whereby the frosting of said one restrictor by the passage of liquid refrigerant therethrough and the non-frosting of the other of said flow restrictors indicates a liquid level in said receptacle between said flow restrictor connections.

4. A refrigeration system comprising a condenser, fixed flow restricting means, an evaporator, a suction line and a compressor series connected to form a closed refrigerant circuit, charge modulating means comprising a dead-end storage receptacle in heat exchange relation with said suction line and connected by a two-way flow connection to a point in said system between said restricting means and said evaporator, a normally open valve between said point and said evaporator, at least two flow restrictors connecting said receptacle to said suction line and normally closed valve means for preventing flow through said flow restrictors, said flow restrictors having flow restrictions such that during operation of said system with said normally open valve closed and said normally closed valve open substantially all of the refrigerant in said system will collect as a liquid in said receptacle, one of said flow restrictors being connected to said receptacle below the other of said flow restrictors whereby the frosting of said one restrictor by the passage of liquid refrigerant therethrough and the non-frosting of the other of said flow restrictors indicates a liquid level in said receptacle between said flow restrictor connections, and an additional flow restrictor connecting a lower portion of said receptacle to said suction line and operable when said normally closed valve is open to provide a minimum flow of liquid refrigerant to said compressor for the cooling thereof.

References Cited in the file of this patent

UNITED STATES PATENTS

| | | |
|---|---|---|
| 1,533,336 | Pownall | Apr. 14, 1925 |
| 2,753,693 | Zearfoss | July 10, 1956 |
| 2,759,340 | Beslin | Aug. 21, 1956 |
| 3,093,976 | Walcutt | June 18, 1963 |